United States Patent [19]
Lin

[11] Patent Number: 5,708,516
[45] Date of Patent: Jan. 13, 1998

[54] MOVING MECHANISM OF A SCANNER

[76] Inventor: Bob Lin, No. 9, Lane 102, San-Min Rd., Taipei, Taiwan

[21] Appl. No.: 646,021

[22] Filed: May 7, 1996

[51] Int. Cl.$^6$ .............................. H04N 1/04; H01J 3/14
[52] U.S. Cl. .................... 358/474; 358/494; 399/212; 250/234
[58] Field of Search .................... 358/474, 494, 358/497; 250/234, 235, 236, 208.1, 239; 399/211, 212, 206

[56] References Cited

U.S. PATENT DOCUMENTS

| | | | |
|---|---|---|---|
| 3,662,103 | 5/1972 | Willmer et al. | 358/474 |
| 3,884,574 | 5/1975 | Doi et al. | 399/211 |
| 3,886,371 | 5/1975 | Lloyd | 358/474 |
| 4,346,984 | 8/1982 | Kingsley | 358/497 |
| 4,500,197 | 2/1985 | Dannatt | 399/211 |
| 4,603,963 | 8/1986 | Hinton et al. | 399/212 |
| 5,251,039 | 10/1993 | Kusumoto et al. | 358/497 |
| 5,289,000 | 2/1994 | Toyofuku | 250/234 |
| 5,311,015 | 5/1994 | Takeuchi | 358/497 |

Primary Examiner—Edward L. Coles, Sr.
Assistant Examiner—Kimberly A. Williams
Attorney, Agent, or Firm—Bacon & Thomas

[57] ABSTRACT

A moving mechanism installed in a scanner to move a scanning mechanism and a reflecting unit to achieve a scanning operation, the moving mechanism including a pulley wheel transmission mechanism and a belt transmission mechanism, the scanning mechanism being fixed to the rope of the pulley wheel transmission mechanism, the reflecting unit being pivoted to the movable pulley wheels of the pulley wheel transmission mechanism and driven by the belt transmission mechanism to move the scanning mechanism or the reflecting unit, permitting the rope of the pulley wheel transmission mechanism to be moved relative to the movable pulley wheels at the speed ratio of 2:1 so that the scanning mechanism is relatively moved when the belt transmission mechanism is driven to move the scanning mechanism or the reflecting unit, and the optical distance between the document and the CCD is maintained unchanged.

2 Claims, 5 Drawing Sheets

MOVING MECHANISM OF A SCANNER

BACKGROUND OF THE INVENTION

The present invention relates to the moving mechanism of a scanner which is controlled to move the scanning mechanism and reflecting unit of the scanner, causing them to achieve a document scanning operation.

A variety of scanners have been developed for use with computers so that documents can be efficiently inputted into computers by scanning. The moving mechanism of a scanner includes a scanning mechanism which is comprised of a light source and a lens, a reflecting unit adapted for reflecting light from the lens of the light source to a CCD (charge-coupled device) array, and a transmission mechanism driven to move the scanning mechanism and the reflecting unit at the speed ratio of 2:1.

SUMMARY OF THE INVENTION

The present invention designs transmission mechanism for scanners which comprises a pulley wheel transmission mechanism and a belt transmission mechanism. The scanning mechanism of the scanner is fixed to the rope of the pulley wheel transmission mechanism. The reflecting unit is pivoted to the movable pulley wheels of the pulley wheel transmission mechanism and driven by the belt transmission mechanism to move the scanning mechanism or the reflecting unit, permitting the rope of the pulley wheel transmission mechanism to be moved relative to the movable pulley wheels thereof at the speed ratio of 2:1 so that the scanning mechanism is relatively moved when the belt transmission mechanism is driven to move the scanning mechanism or the reflecting unit, and the optical distance between the document and the CCD is maintained unchanged.

DETAILED DESCRIPTION OF THE PREFERRED EMBODIMENT

Figure 1:
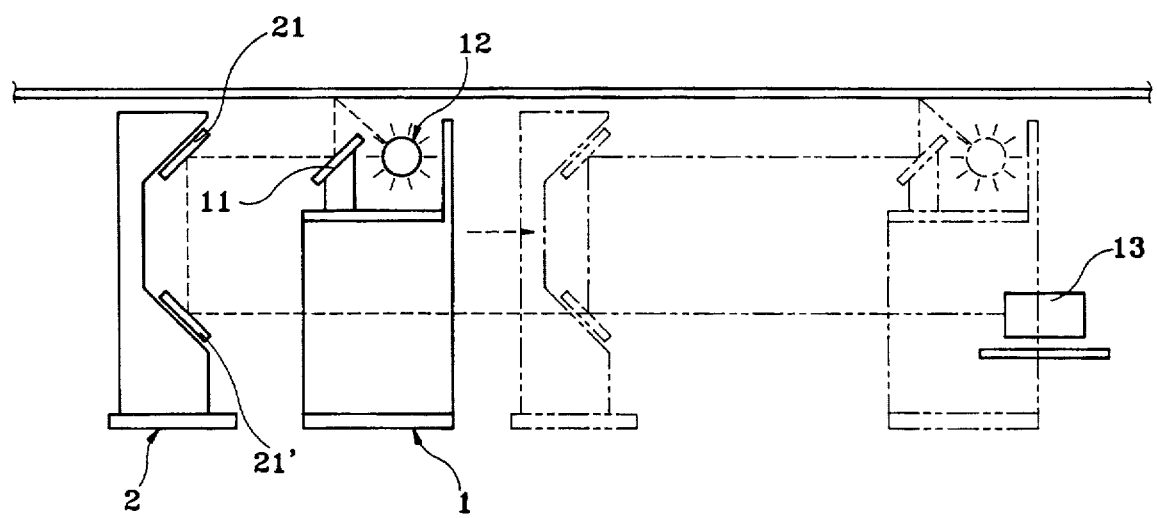
FIG. 1 shows the internal arrangement of a scanner according to the present invention.
Figure 2:
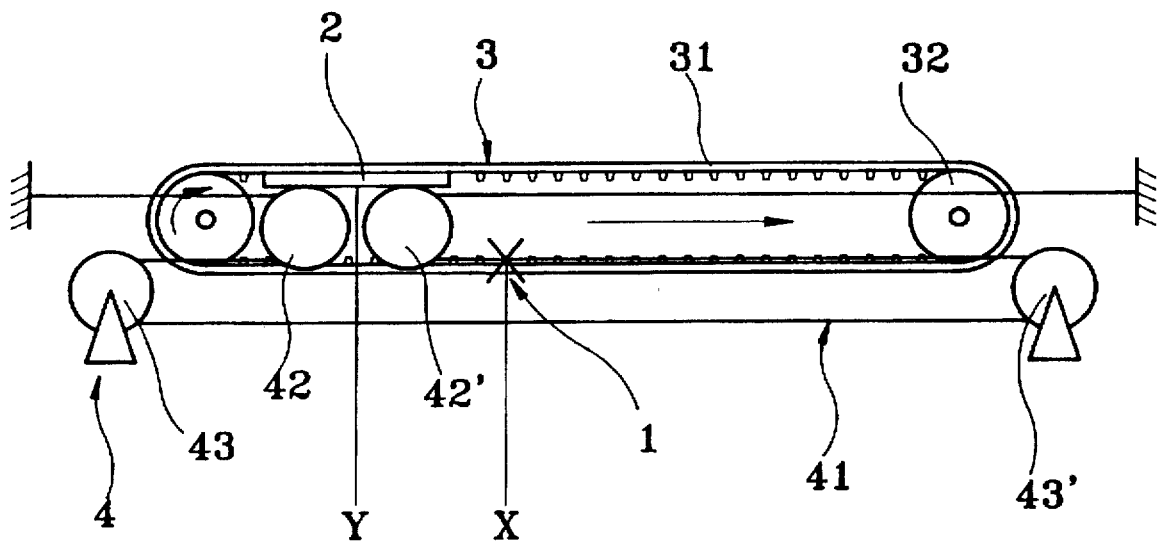
FIG. 2 is a front view of the moving mechanism according to the present invention.

Referring to FIG. 1 and 2, the moving mechanism of a scanner in accordance with the present invention is generally comprised of a scanning mechanism 1, a reflecting unit 2, a belt transmission mechanism 3, a CCD (charge-coupled device) array 13, and a pulley wheel transmissionmechanism 4. The scanning mechanism 1 is comprised of a lens 11, and a light source 12.

The scanning mechanism 1 is fixedly mounted on the belt transmission mechanism 3 at a suitable location (see mark "X" shown in FIG. 2). The reflecting unit 2 comprises a first reflecting lens 21 and a second reflecting lens 21' (see FIG. 1), and is moved with the scanning mechanism 1 on the same plane over the document. The belt transmission mechanism 3 as shown in FIG. 2, is comprised of a toothed transmission belt 31, and a pair of belt wheels 32 mounted on the shell of the scanner 1. The pulley wheel transmission mechanism 4 comprises a rope 41, a first movable pulley wheel 42, a second movable pulley wheel 42', a first fixed pulley wheel 43, and a second fixed pulley wheel 43'. The rope 41 of the pulley wheel transmission mechanism 4 is turned with scanning mechanism 1 (or the reflecting unit 2). The fixed pulley wheels 43, 43' are fixed to the shell of the scanner The movable pulley wheels 42, 42' are pivoted to reflecting unit 2. The rope 41 has a front end fixed to the shell of the scanner, and a rear end passing over the first fixed pulley wheel 42, which is fixed to the reflecting unit 2, the first fixed pulley wheel 43, which is mounted on the shell of the scanner, the second fixed pulley wheel 43', the fixed point of the front end at the scanner, the second movable pulley wheel 42', which is pivoted to the reflecting unit 2, and then to an opposite end at the shell of the scanner.

Figure 3:
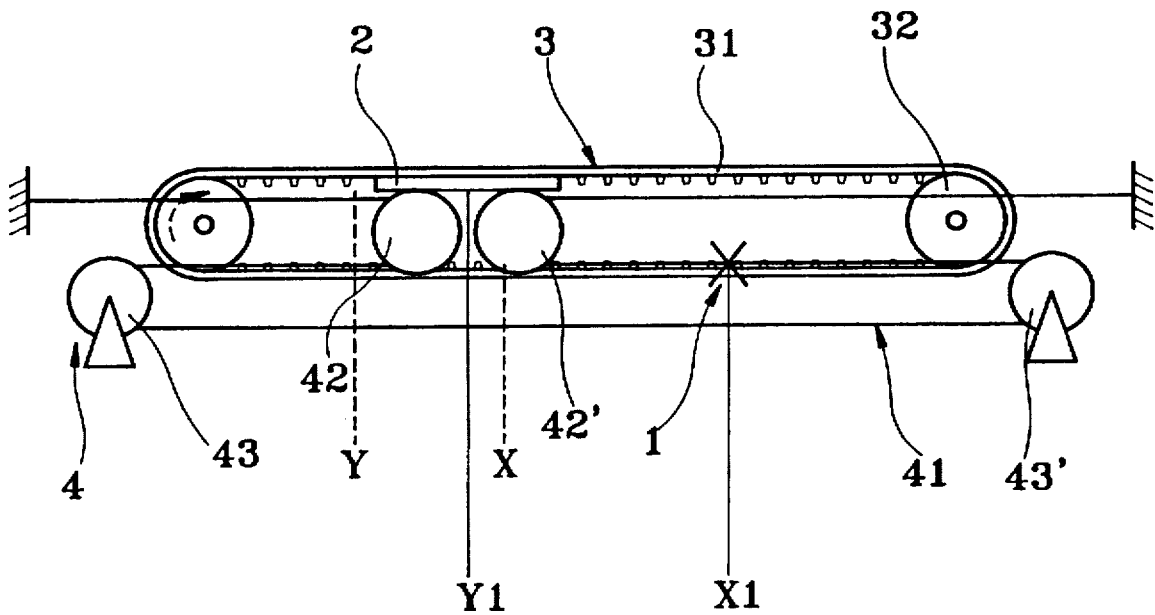
FIG. 3 shows the moving mechanism moved according to the present invention (during scanning)
Figure 4:
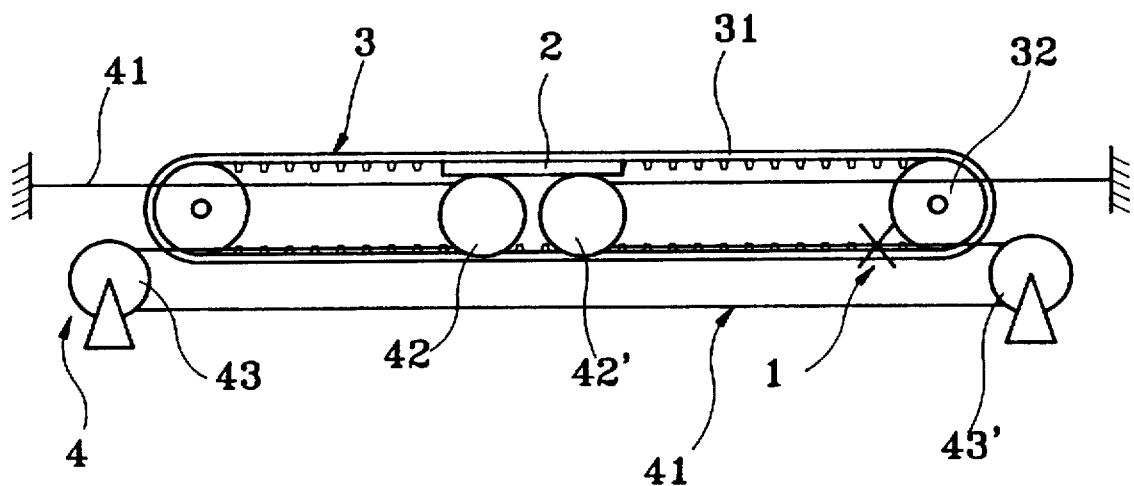
FIG. 4 shows the moving mechanism moved according to the present invention (after scanning)
Figure 5:
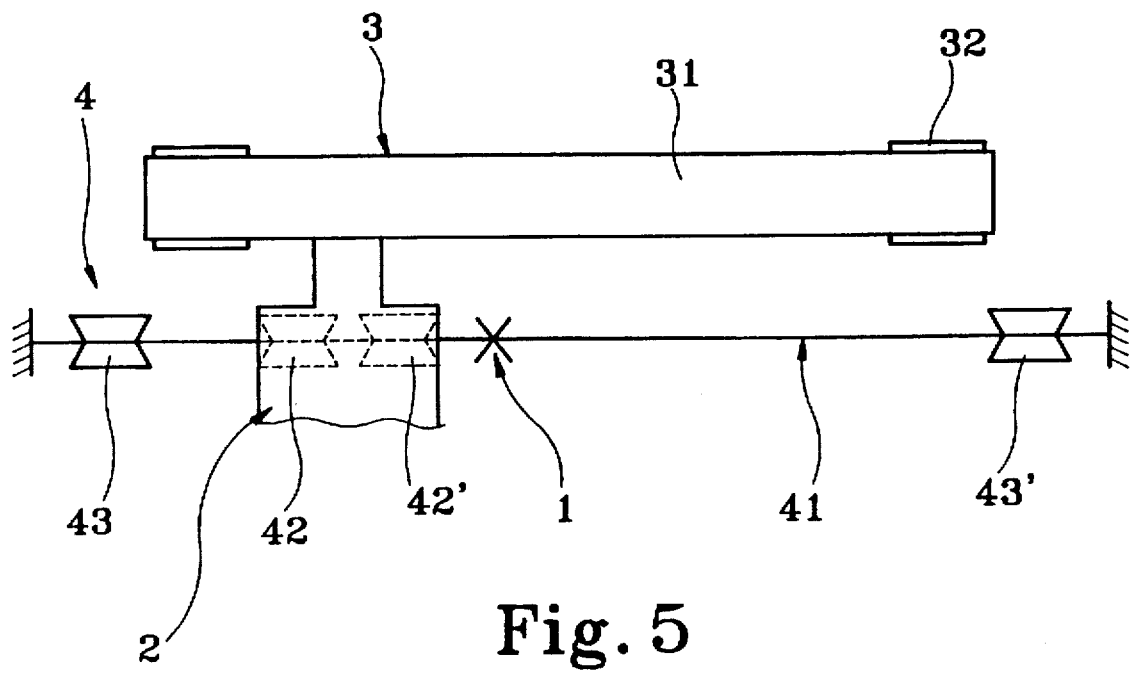
FIG. 5 is a top view of FIG. 2.

Referring to FIGS. from 2 to 5, when the moving mechanism of the scanner does no work, the scanning mechanism 1 is disposed at point X, the reflecting unit 2 is disposed at point Y (see FIGS. 2 and 5); during scanning, as shown in FIG. 3, the reflecting unit 2 is moved from point Y to point Y1, and the scanning mechanism 1 is moved from point X to point X1; the ratio of the movement between the scanning mechanism 1 and the reflecting unit 2 is $(X1-X)/(Y1-Y)= 2/1$, i.e., the speed ratio between the scanning mechanism 1 and the reflecting unit 2 during scanning is 2:1 (see FIG. 4). After scanning, the scanning mechanism 1 and the reflecting unit 2 are moved back to their former positions at the speed ration of 2:1.

Figure 7:
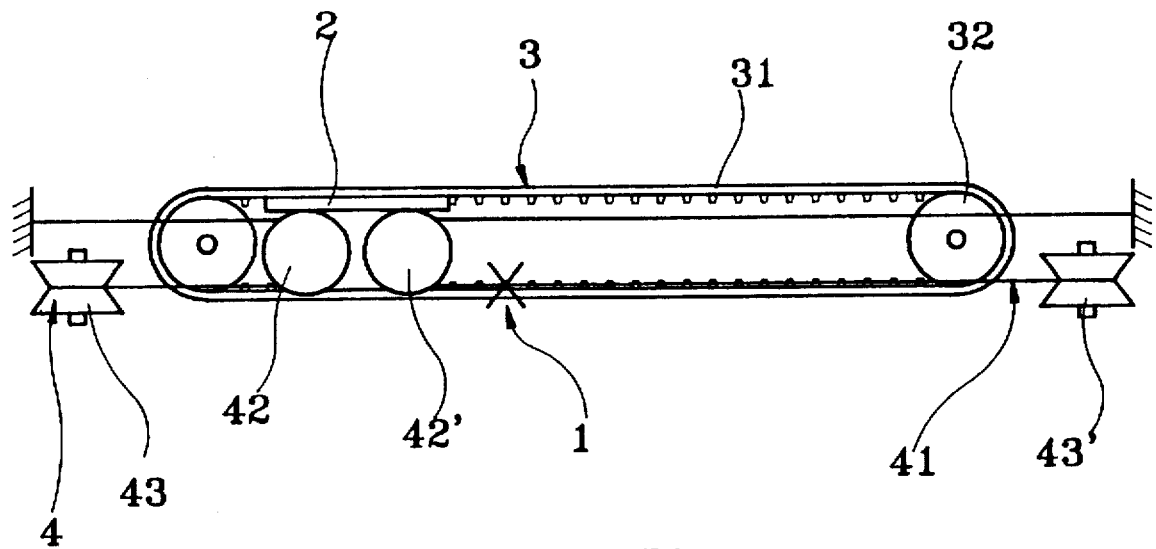
FIG. 7 shows an alternate form of the present invention.
Figure 6:
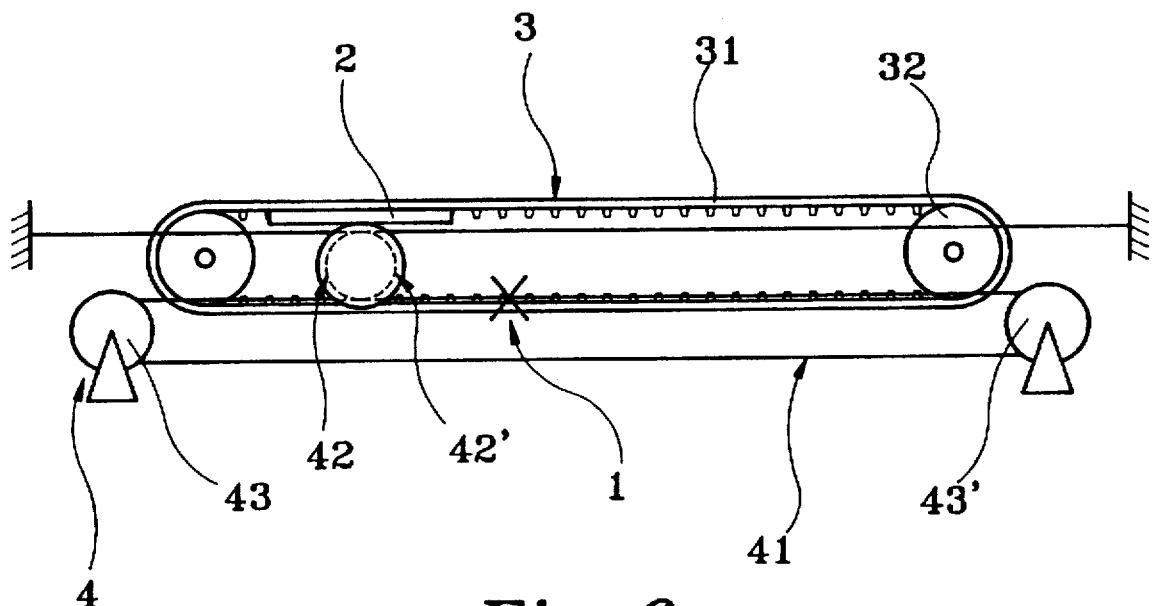
FIG. 6 shows one arrangement of the present invention.
Figure 8:
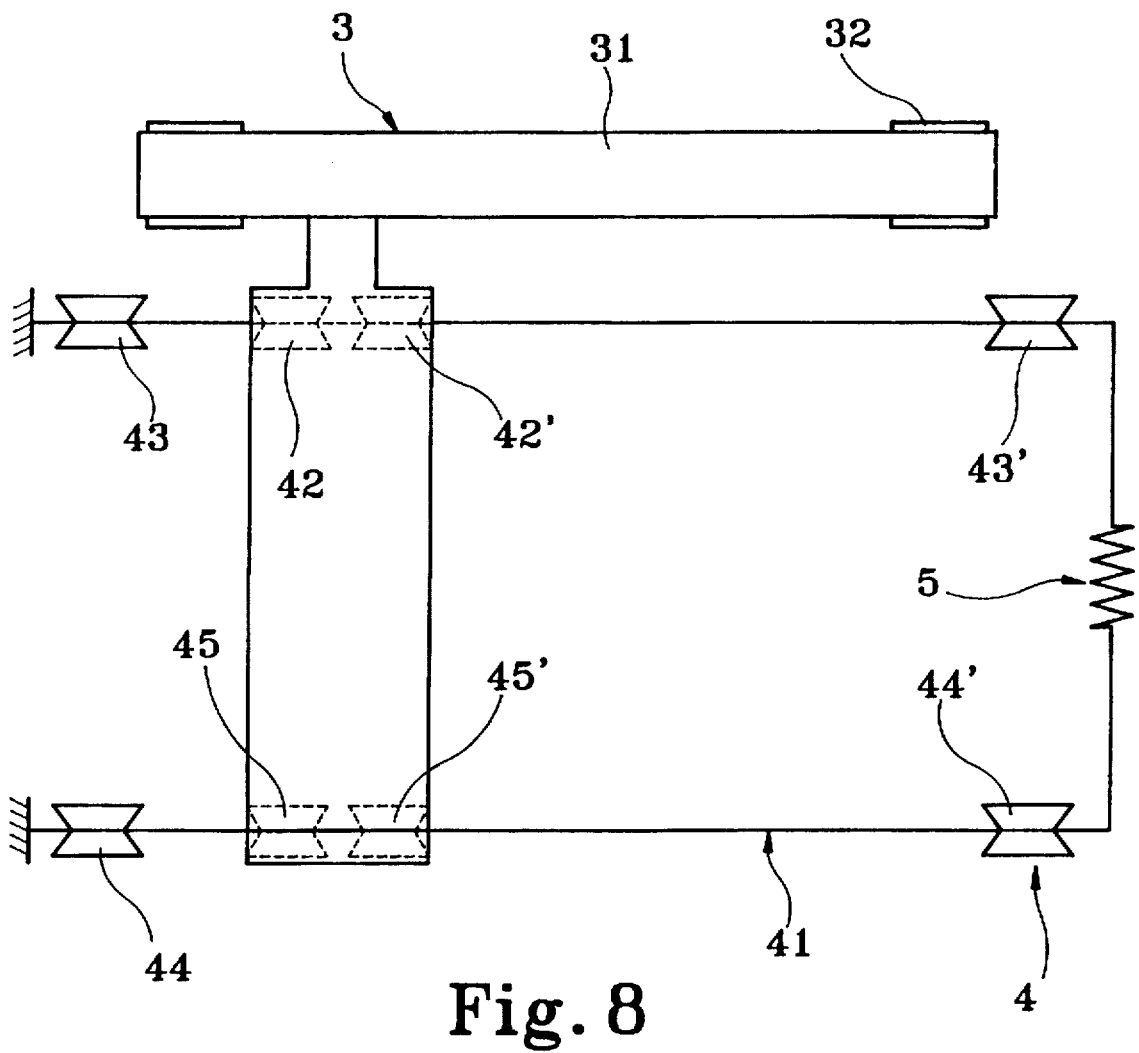
FIG. 8 shows another alternate form of the present invention.
Figure 9:
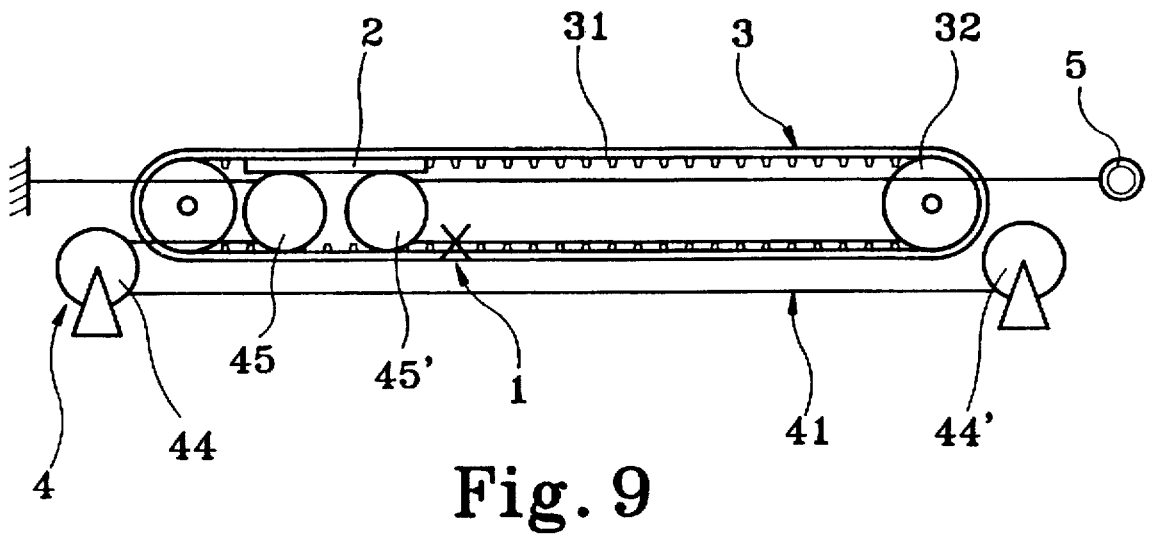
FIG. 9 is a side view of FIG. 8.

As one arrangement of the present invention, the movable pulley wheels 42, 42' may be pivoted to the reflecting unit 2 in the radial direction (see FIG. 6). As another arrangement of the present invention, the fixed pulley wheels 43, 43' may be set in such a position in which the turning direction of the fixed pulley wheels 43, 43' and the turning direction of the belt wheels 32 are arranged at right angles (see FIG. 7). As still another arrangement of the present invention, two pairs of fixed pulley wheels 43, 43', 44, 44' and two pairs of movable pulley wheels 42, 42', 45, 45' may be installed and connected in parallel by a spring 5.

I claim:

1. A moving mechanism installed in a scanner to move a scanning mechanism, which is comprised of a light source of a lens, a reflecting unit, which is comprised of a first lens and a second lens, at a speed ratio of 2:1, so as to achieve a scanning operation, the moving mechanism comprising:

a pulley wheel transmission mechanism, said pulley wheel transmission mechanism comprising a rope, a first movable pulley wheel, a second movable pulley wheel, a first fixed pulley wheel, and a second pulley wheel, said first and second movable pulley wheels being pivoted to said reflecting unit, said fixed pulley wheel being fixed to the shell of the scanner, said rope having a front end fixed to the shell of the scanner, and a rear end passing over said first fixed pulley wheel, which is fixed to said reflecting unit, said first fixed pulley wheel, which is mounted on the shell of the scanner, said second fixed pulley wheel, the fixed point of said front end at the scanner, said second movable pulley wheel, which is pivoted to said reflecting unit, and then to an opposite end at the shell of the scanner, said rope being coupled to said scanning mechanism, permitting it to be disposed between said second fixed pulley wheel and said second movable pulley wheel; and a second transmission mechanism controlled to move said reflecting unit, causing it to move the rope of said pulley wheel transmission mechanism.

2. The moving mechanism of claim 1 wherein said transmission mechanism is a belt transmission mechanism comprised of a pair of belt wheels fixedly mounted on the shell of the scanner, and a transmission belt mounted around said belt wheels, said transmission belt having a fixed point fixedly secured to said reflecting unit and driven by said belt wheels to move said reflecting unit.

* * * * *